Dec. 31, 1946.  L. M. OSTERSTUCK  2,413,466
TORQUE-RESPONSIVE CLUTCH
Filed June 14, 1943  3 Sheets-Sheet 1
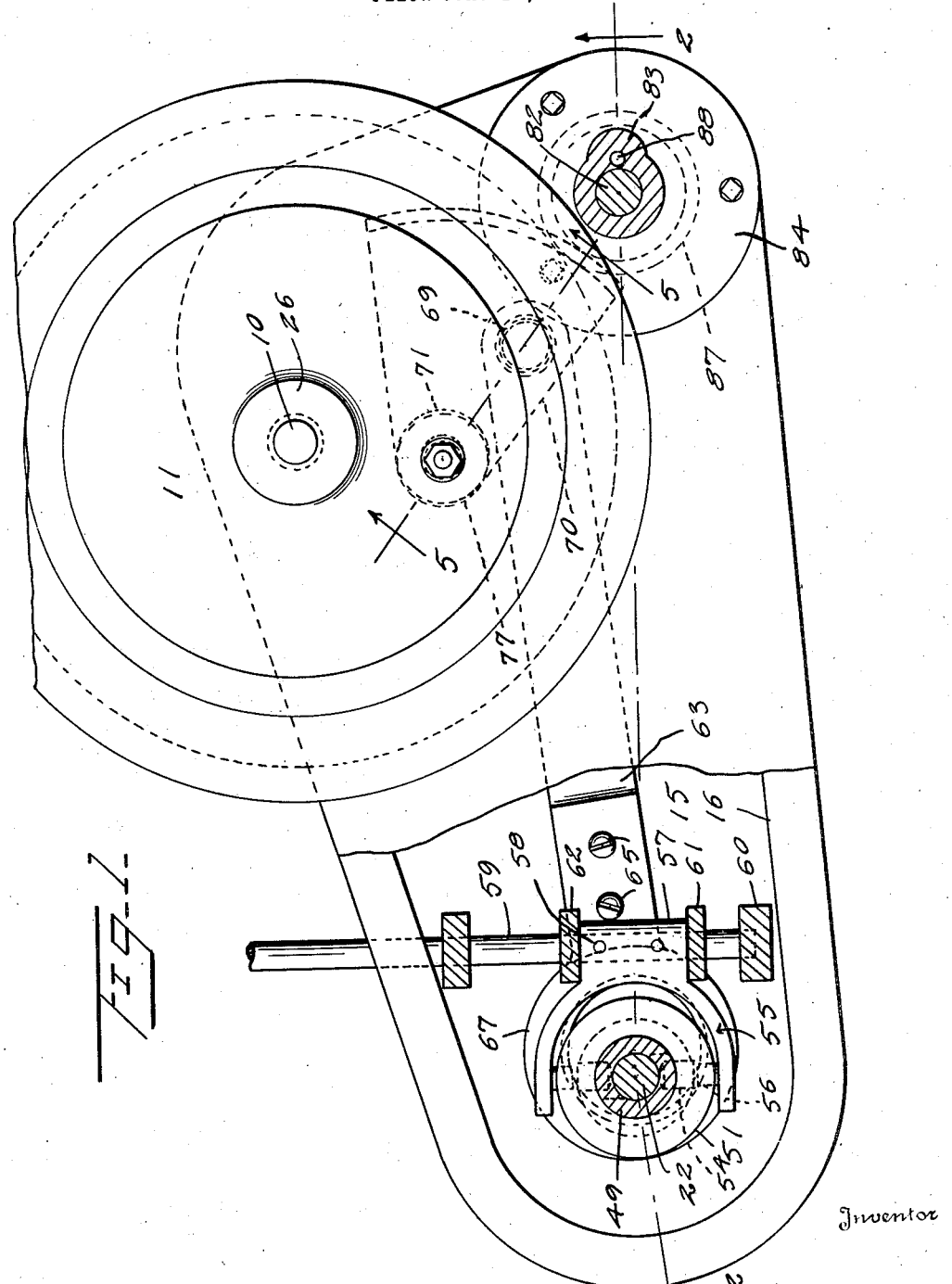
Inventor
Lester M. Osterstuck
By Kimmel & Crowell Attorneys Dec. 31, 1946.  L. M. OSTERSTUCK  2,413,466
TORQUE-RESPONSIVE CLUTCH
Filed June 14, 1943  3 Sheets-Sheet 2
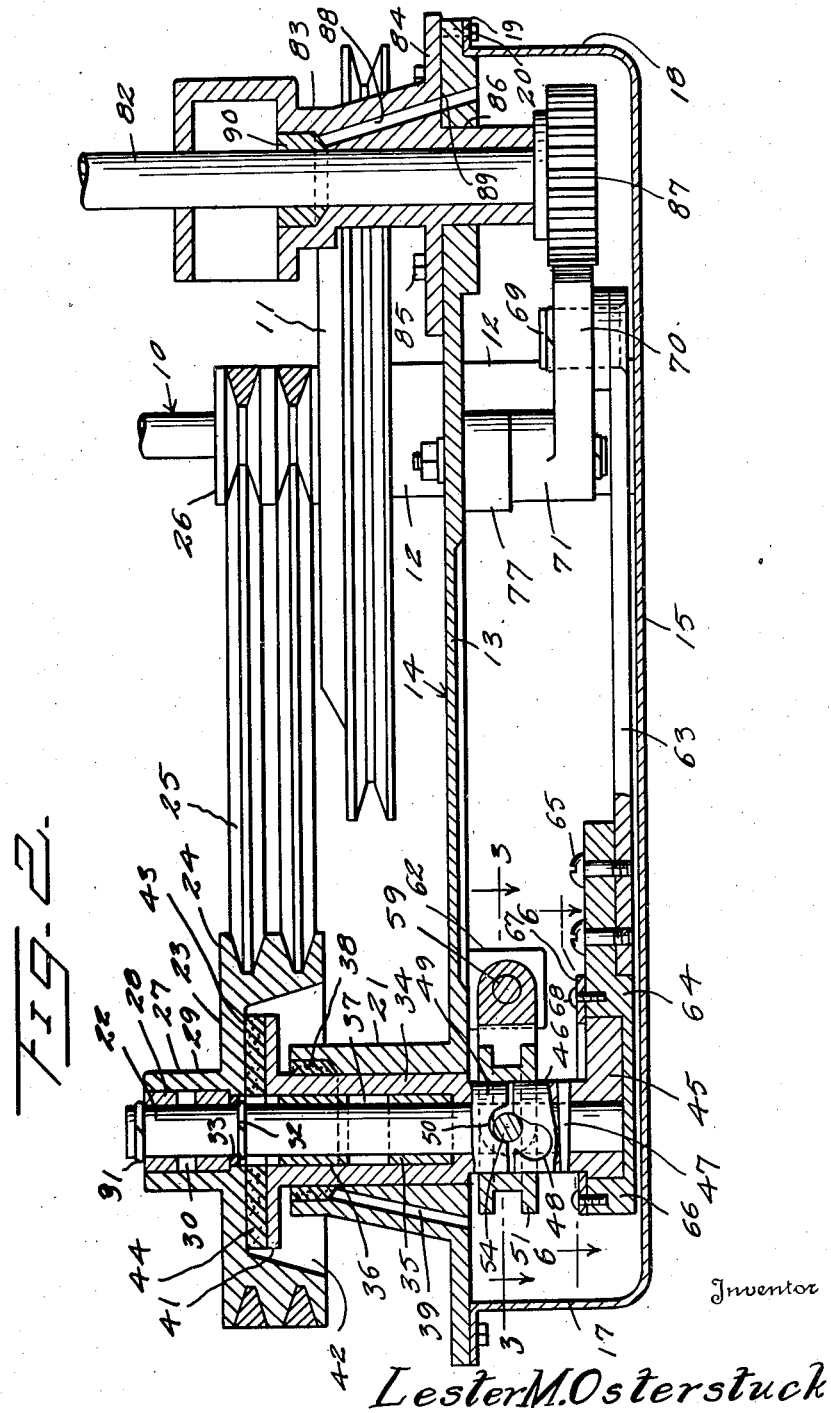
Inventor
Lester M. Osterstuck
By Kimmel & Crowell Attorneys Dec. 31, 1946.  L. M. OSTERSTUCK  2,413,466
TORQUE-RESPONSIVE CLUTCH
Filed June 14, 1943  3 Sheets-Sheet 3
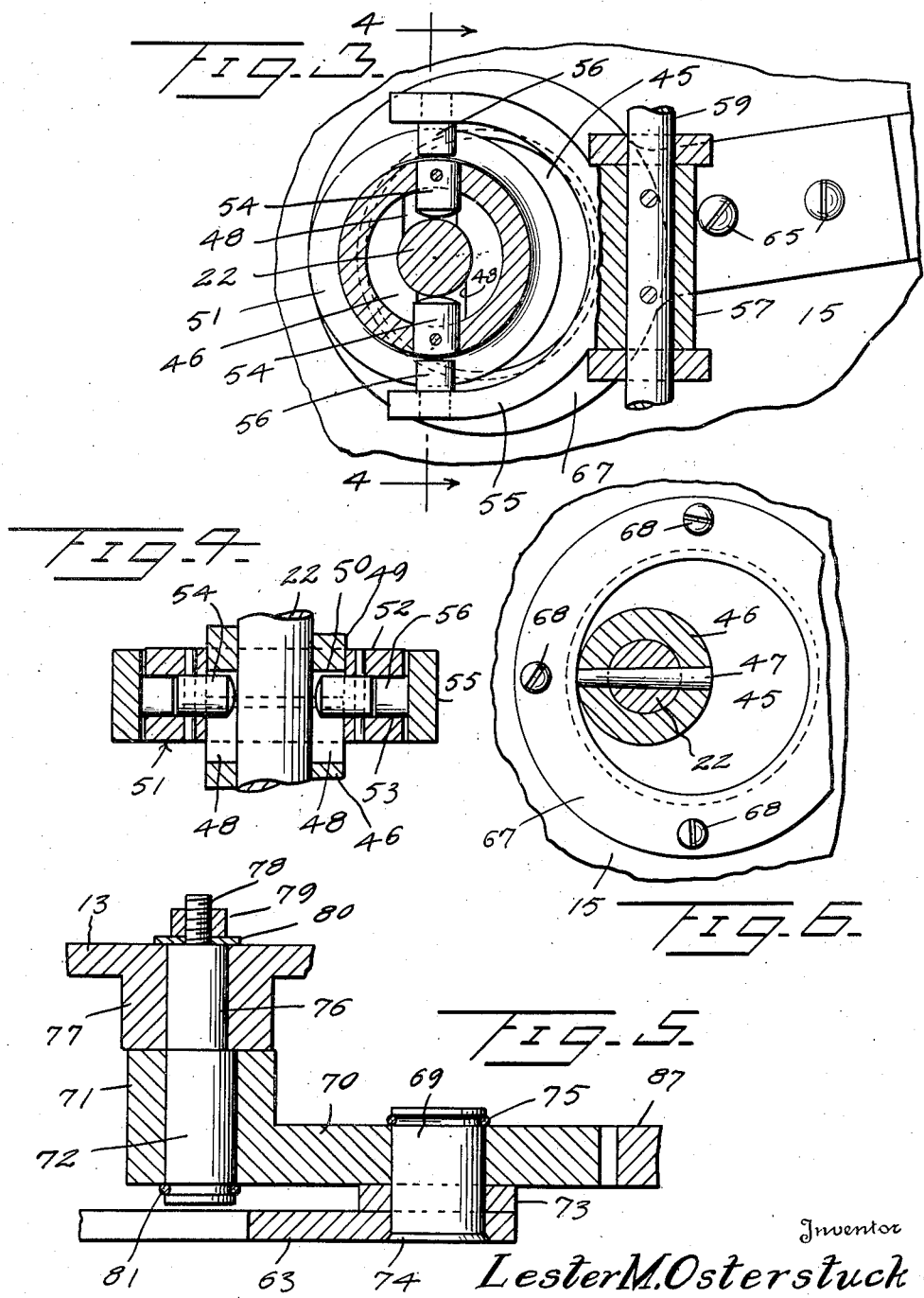
Inventor
Lester M. Osterstuck
By
Kimmel & Crowell
Attorneys Patented Dec. 31, 1946

2,413,466

UNITED STATES PATENT OFFICE 2,413,466

TORQUE-RESPONSIVE CLUTCH

Lester M. Osterstuck, Jamestown, N. Y., assignor of one-half to Milton A. Bissell, Jamestown, N. Y.

Application June 14, 1943, Serial No. 490,790

7 Claims. (Cl. 192—54)

This invention relates to operating means for washing machines.

An object of this invention is to provide an improved operative connection between a power source and an oscillatable washing machine tub wherein a minimum of gears are employed.

Another object of this invention is to provide an improved clutch for a mechanism of this kind which will eliminate springs and wherein the increased torque on the driving element will cause the two clutch elements to be bound tighter together so that there will be no slippage of the clutch.

Another object of this invention is to provide an improved clutch in which the clutch lining may be of the floating type.

A further object of this invention is to provide an improved clutch which is simple in construction so that it will withstand hard usage and will not readily get out of order.

With the foregoing objects in view, and others which may hereinafter more fully appear, the invention consists of the novel construction, combination and arrangement of parts, as will be more specifically described, and illustrated in the accompanying drawings wherein are shown embodiments of the invention, but it is to be understood that changes, variations and modifications may be resorted to which fall within the scope of the invention, as claimed.

In the drawings:

Figure 1 is a top plan, partly broken away and in section, of a clutch and operating mechanism for a washing machine;

Figure 2 is a sectional view taken on the line 2—2 of Figure 1;

Figure 3 is a sectional view taken on the line 3—3 of Figure 2;

Figure 4 is a sectional view taken on the line 4—4 of Figure 3;

Figure 5 is a sectional view on the line 5—5 of Figure 1;

Figure 6 is a sectional view taken on the line 6—6 of Figure 2.

Referring to the drawings, the numeral 10 designates a drive shaft which has fixed thereto a driving pulley 11. The pulley 11 is a grooved pulley and is adapted to be connected to a motor through a belt connection (not shown). The drive shaft 10 in the present instance, is vertically disposed and is journalled in a bearing or bushing 12, which is carried by a housing, generally designated as 14. The housing 14 includes a top wall 13, a bottom wall 15, upstanding side walls 16, and opposite end walls 17 and 18. The walls 15, 16, 17 and 18 comprise a removable housing part which is formed at its upper edge with an outwardly projecting flange 10 secured to the top wall 13 by fastening members 20. The housing 14 has formed integral therewith, an upwardly extending bearing or bushing 21 which is spaced from the bearing 12. A vertically disposed driven shaft 22 is journalled through the bearing 21 and has rotatably mounted on the upper portion thereof a driven pulley 23. The driven pulley 23 is provided with a pair of V-grooves 24 and a pair of V-belts 25 engage in the grooves 24 and also engage a pair of small grooved pulleys 26 which are secured to the drive shaft 10 above the large drive pulley 11. The driven pulley 23 is formed with an upwardly extending hub or bushing 27 within which a pair of liners or bearings 28 and 29 are disposed, the bearings 28 and 29 being spaced apart at their inner ends so as to provide a lubricating chamber 30. The shaft 22 has mounted on the upper end thereof a split locking ring 31 bearing against the upper liner 28 so as to hold the shaft 22 against downward movement when the clutch structure is in a clutching position. The shaft 22 also has mounted thereon, at a point spaced downwardly from the locking ring 31, a second locking ring 32 and a washer or thrust member 33 is interposed between the locking ring 32 and the lower end of the liner or bearing 29. The locking ring 32 and the washer 33 coact with the locking link 31 in holding the pulley 23 against endwise movement with respect to the shaft 22. The bushing 21, has rotatable therein, and about the shaft 22, a hollow shaft 34. A pair of liners 35 and 36 are interposed between the inner side of the hollow shaft 34 and the shaft 22, being spaced apart at their inner ends so as to provide a lubricating chamber 37. A sealing member 38 is carried by the upper portion of the bushing 21, and seals the upper portion of the hollow shaft 24 in the bushing 21. The bushing 21 is formed with a downwardly extending duct or opening 39 communicating the sealing member 38 with the interior of the housing 14 so that any lubricant in the housing 14 will pass through the duct 39 and lubricate the sealing member 38 which will, in turn, lubricate the hollow shaft 34. The shaft 34, at the upper end thereof, has secured thereto or formed integral therewith, a clutch plate 41. The pulley 24 is formed in the lower side thereof with an annular recess 42 and the upper end of the recess 42 forms a flat clutch face 43 confronting the upper face of the clutch plate 41.

A fabric liner 44 is interposed between the clutch plate 41 and the clutch face 43 and, in the present instance, the liner 44 is of the floating type being loosely disposed between the two clutch members including the plate 41 and the web of the plate 23 the latter constituting the upper clutch element. The clutch plate 41 is adapted to be normally in a declutching position spaced downwardly from the combined pulley and clutch member 23 and is raised or moved upwardly to a clutching position by clutch operating means to be hereinafter described. An annular cam 45 is fixedly secured to the lower end of the shaft 22 and is formed with an upwardly extending sleeve or clutch member 46. The sleeve or clutch member 46 is secured relative to the shaft 22 by means of a tapered pin 47 or other suitable fastening means. The upper end of the lower clutch member or sleeve 46 is formed with a pair of diametrically disposed inclined slots 48. The lower end of the tubular shaft 34 is formed with a reduced stub 49 which is also provided with a pair of diametrically disposed recesses 50. An annular coupling member, generally designated as 51, is loosely disposed about the clutch member 46 and the stub shaft 49. The coupling member 51 includes an annular body 52 which is formed with an annular groove 53. A pair of clutching pins 54 are fixed to the body 52 and are adapted to normally seat, when in a declutching position, entirely within the slots 48. The coupling member 51 is vertically moved to a clutching or declutching position by means of an operating fork 55. The fork 55 is formed with a pair of opposed rollers or pins 56 which engage in the groove 53. The fork 55 includes a bushing 57 which is secured by fastening members 58 to a fork operating shaft 59. The shaft 59 is rockably mounted in a pair of depending lugs 60 which are carried by the lower side of the top wall 13 of the housing 14. The fork 55 may be held against endwise movement with respect to the shaft 59 by means of a pair of collars 61 and 62 which are secured to the shaft 59 at the opposite ends of the bushing 57. The outer or projecting end of the shaft 59 may have a suitable handle or the like secured thereto whereby the shaft 59 may be manually operated to effect clutching or declutching of the clutch pins 54 and the clutching of the clutch elements 41, 23 and 44.

The cam 45 is adapted to effect oscillation of an elongated link 63. The link 63 is horizontally disposed in the lower portion of the housing 14, and has secured to one end thereof a cam-engaging plate 64. The plate 64 is secured to the link 63 by fastening members 65 and is formed with an annular recess 66 which opens upwardly and within which the cam 45 rotatably engages.

A holding ring 67 is secured to the upper side of the plate 64 by fastening members 68 and overlaps the upper side of the cam 45 so as to hold the plate 45 against vertical movement with respect to the cam 45. The opposite end of the link 45 is mounted on a stub shaft 69 which is carried by a toothed quadrant 70. The quadrant 70 is formed with a hub 71 which is rockably carried by a vertically disposed shaft 72. The link 63 is formed with a boss 73 at its forward end, which provides an enlarged bearing for the lower portion of the shaft 69. The lower end of the shaft 69 may be upset, as at 74, or otherwise secured in the link 63 and the upper end of the shaft 69 has mounted thereon a split locking link 75. The shaft 72 has formed integral therewith, an eccentrically disposed shaft 76 which is mounted in a boss 77 depending from the top wall 13. The upper end of the shaft 76 is formed with a reduced threaded stub 78 about which a holding nut 79 is threaded and a washer 80 is interposed between the nut 79 and the upper side of the wall 13 so that tightening of the nut 79 will hold the shaft members 72 and 76 against rotation and in their adjusted positions. The quadrant 70 is held against downward movement with respect to the shaft 72 by means of a split locking ring 81 which is mounted on the lower end of the shaft 72.

A vertically disposed tub shaft 82 is carried by a bearing 83. The bearing 83 is formed with a flange 84 which is secured to the housing 14 by fastening members 85. The bearing 84 projects downwardly through an opening 86 in the top wall 13, and has secured to the lower end thereof a gear 87 which meshes with the quadrant 70. The bearing or bushing 83 is formed with a downwardly extending oil duct 88 which communicates with a duct 89 formed in the top wall 13 so that the lubricant in the housing 14 may extend through the ducts 88 and 89 for lubricating a sealing member 90 carried by the upper portion of the bearing or bushing 83.

In the use and operation of this operating and clutch mechanism the pulley 11 is connected with a power device, such as a motor or the like. Rotation of the pulley 11 will effect rotation of the combined pulley and clutch member 23. When the clutch structure is in a declutching position the coupling member 51 will be in a lower position with the clutching pins 54 disposed entirely within the diametrical recess 48. In this latter position the link 63 will be stationary. However, when it is desired to oscillate the shaft 82 the shaft 59 is rocked to raise the fork 55 and the coupling member 51. The clutching or coupling pins 54 are moved upwardly into the recess 50 carried by the lower stub shaft 49. Due to the configuration of the slots 48 of the lower clutching sleeve 46 the torsional strain on the clutching pins 54 will cause these pins to move upwardly and more deeply into the upper slots 50. These latter slots are of such a depth that the coupling pins 48 will not be disposed entirely within such slots so that the two clutching members 46 and 49 will be coupled together when the pins 54 are in the position shown in Figure 2. The torsional strain on the clutching pins 54 will cause the hollow shaft 34 to move upwardly thereby raising clutching plate 41 to bring the clutch lining 44 into engagement with the clutching face 43 of the pulley 23. At this time the hollow shaft 34 and the cam 45 will rotate as a unit with the pulley 23 and link 63 will be oscillated thereby rocking the segment 70 and oscillating the tub shaft 82 through the gear 87.

I claim:

1. In a driving mechanism, a continuously rotatable member, a shaft loosely carried by said member, a hollow clutch shaft rotatable about said first shaft, an operating element fixed to said first shaft below said hollow shaft, said element including a tubular lower coupling member formed with a pair of diametrically opposed slots, a slotted upper coupling member carried by the lower end of said hollow shaft, an annular coupling member loosely disposed about said upper and lower coupling members, coupling pins carried by said annular coupling member engageable in said slots of said upper and lower coupling members for locking said operating elements relative to said hollow shaft, correlated friction clutch means carried by said rotatable member and said hollow shaft, said friction clutch means disposed in clutching position when said pins are in the slots of said upper and lower coupling members, and means for moving said annular member to coupling or uncoupling position.

2. A driving mechanism comprising in combination a drive shaft, a continuously rotatable member loosely carried by said shaft, a clutch member loosely carried by said shaft, a complementary clutch member carried by said first member, and normally shiftable means for moving said first clutch member to clutching position, said means including correlated coupling members carried by said shaft and said first clutch member having correlated coupling pins and confronting notches for exerting increased pressure upon said clutch members proportionate to the pulling force exerted upon said shaft.

3. In a driving mechanism, a continuously rotatable member, a shaft loosely carried by said member, a hollow clutch shaft rotatable about said first shaft, an operating element fixed to said first shaft below said hollow shaft said element including a tubular lower coupling member formed with a pair of diametrically opposed inclined slots, a slotted upper coupling member carried by the lower end of said hollow shaft, an annular coupling member loosely disposed about said upper and lower coupling members, coupling pins carried by said annular coupling member engageable in said slots of said upper and lower coupling members for locking said operating elements relative to said hollow shaft, correlated friction clutch means carried by said rotatable member and said hollow shaft, said friction clutch means disposed in clutching position when said pins are in the slots of said upper and lower coupling members, and means for moving said annular member to coupling or uncoupling position.

4. In combination a driving mechanism, a drive shaft, a continuously rotatable member loosely carried by said shaft, a clutch member loosely carried by said shaft, a complementary clutch member carried by said first member, a friction lining interposed between said clutch members, and correlated coupling means carried by said first clutch member and by said shaft, said means including a pair of notched members carried one by said first clutch member and the other by said shaft, and a shifting collar loosely carried about said notched members, coupling pins carried by said collar engageable in said notches, one of said notches being inclined whereby pull on said shaft will shift said first clutch member to clutching position, said coupling means exerting endwise pressure on said first clutch member proportionate to the pull of said shaft.

5. In a driving mechanism, a continuously rotatable member, a shaft loosely carried by said member, a hollow shaft loose on said first shaft, complementary clutch elements carried by said member and said hollow shaft, a reduced diameter hollow stub shaft carried by said hollow shaft, a slotted coupling member fixed to said first shaft below said stub shaft, said stub shaft having slots confronting the slots of said coupling member, an annular member loosely about said stub shaft and said coupling member, pins carried by said annular member engageable in said confronting slots for locking said coupling member to said hollow shaft, the slots of said coupling member being inclined to the length of said coupling member in a direction whereby torsional pull on said coupling member will cause said pins to exert increased endwise pressure on said hollow shaft and thereby effect increased pressure on said clutch elements.

6. A clutch mechanism comprising a rotatable driving member, a shaft extending loosely through said member, a clutch element carried loosely by said shaft and means correlated with said latter element, said means including notched coupling members together with coupling pins for locking the latter element against rotation relative to said shaft while simultaneously exerting endwise force upon said latter element for maintaining said clutch elements in clutching position.

7. A clutch mechanism comprising a continuously rotatable driving member, a driven shaft loose relative to said driving member, and releasable means for clutching said driven shaft to said driving member, said means including coupling members having correlated coupling pins and confronting notches so arranged that increased torsional strain upon said driven shaft will exert a greater clutching force between said driving member and said driven shaft.

LESTER M. OSTERSTUCK.